July 21, 1953  W. F. LINSTEDT  2,645,984
BOXMAKING MACHINE
Filed Aug. 22, 1946  12 Sheets-Sheet 10
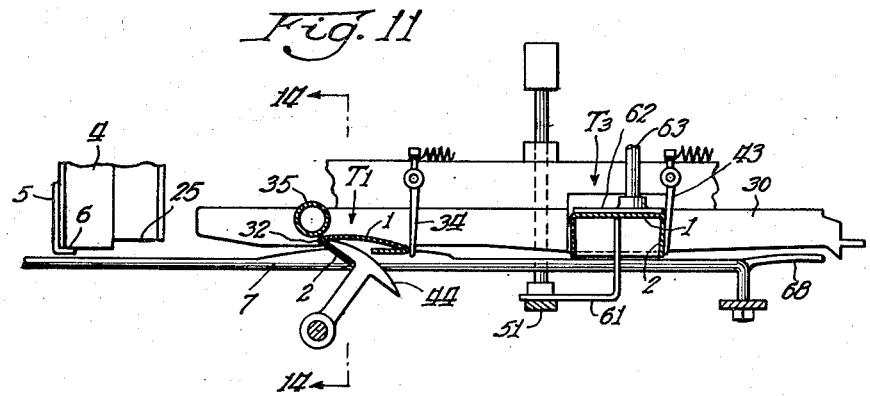
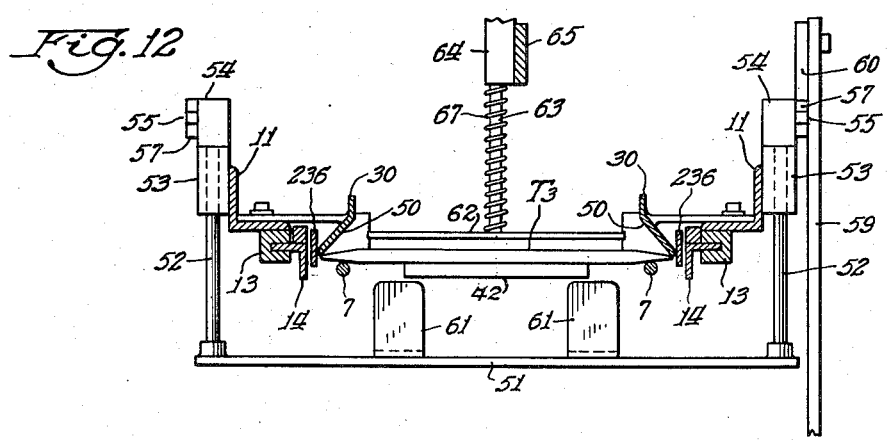
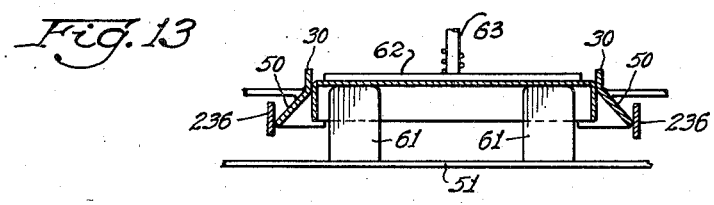
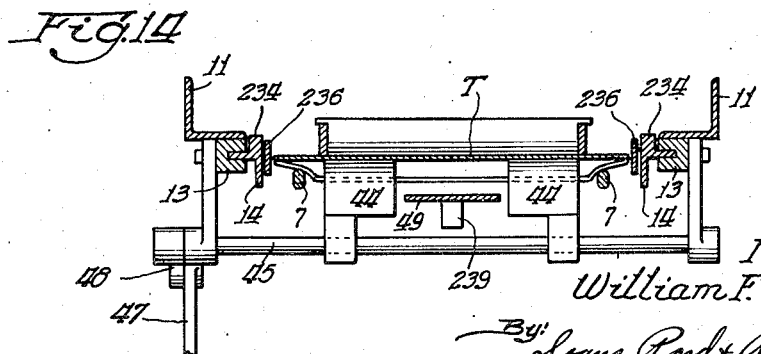
Inventor:
William F. Linstedt
By: Soans, Pond & Anderson
Attys.

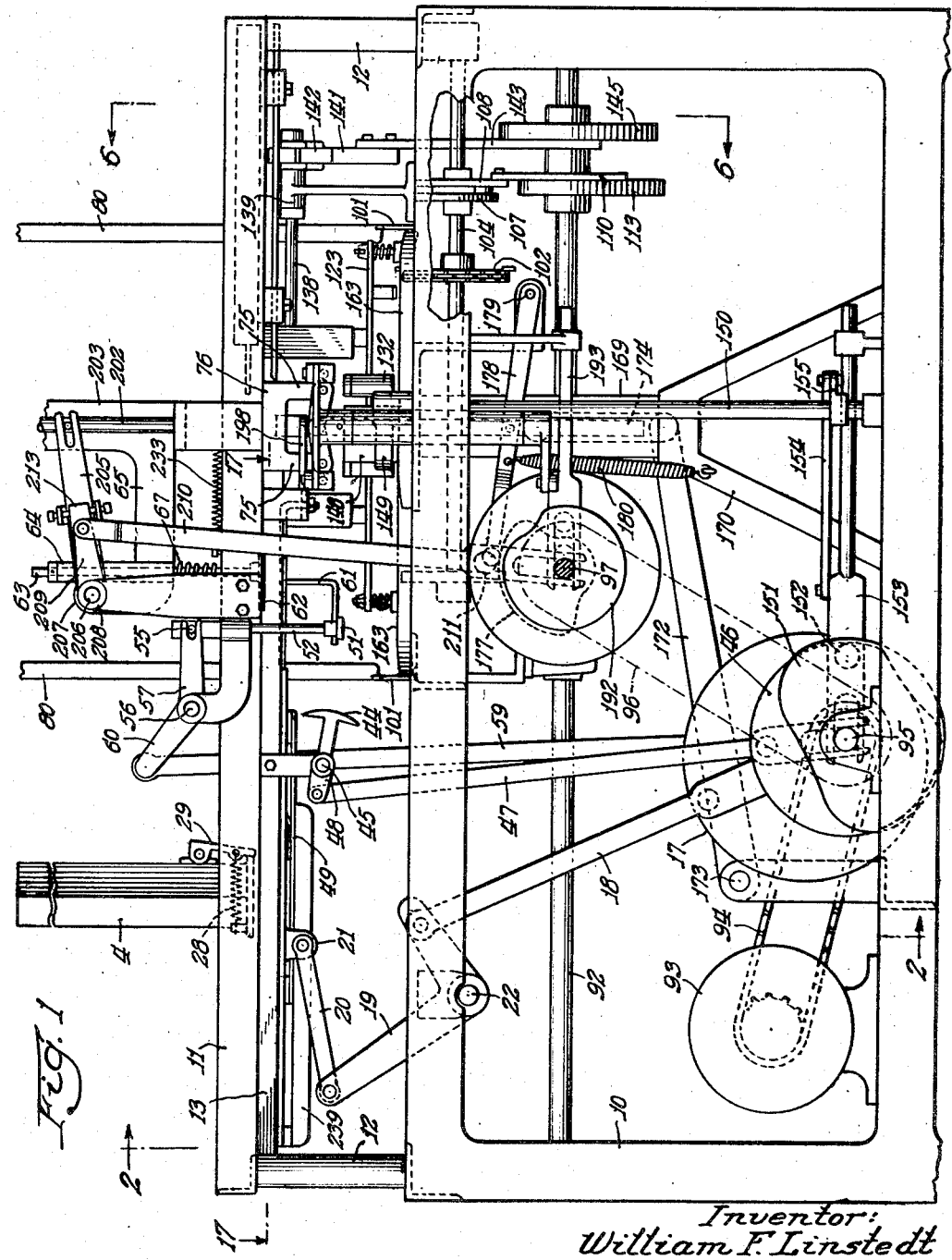

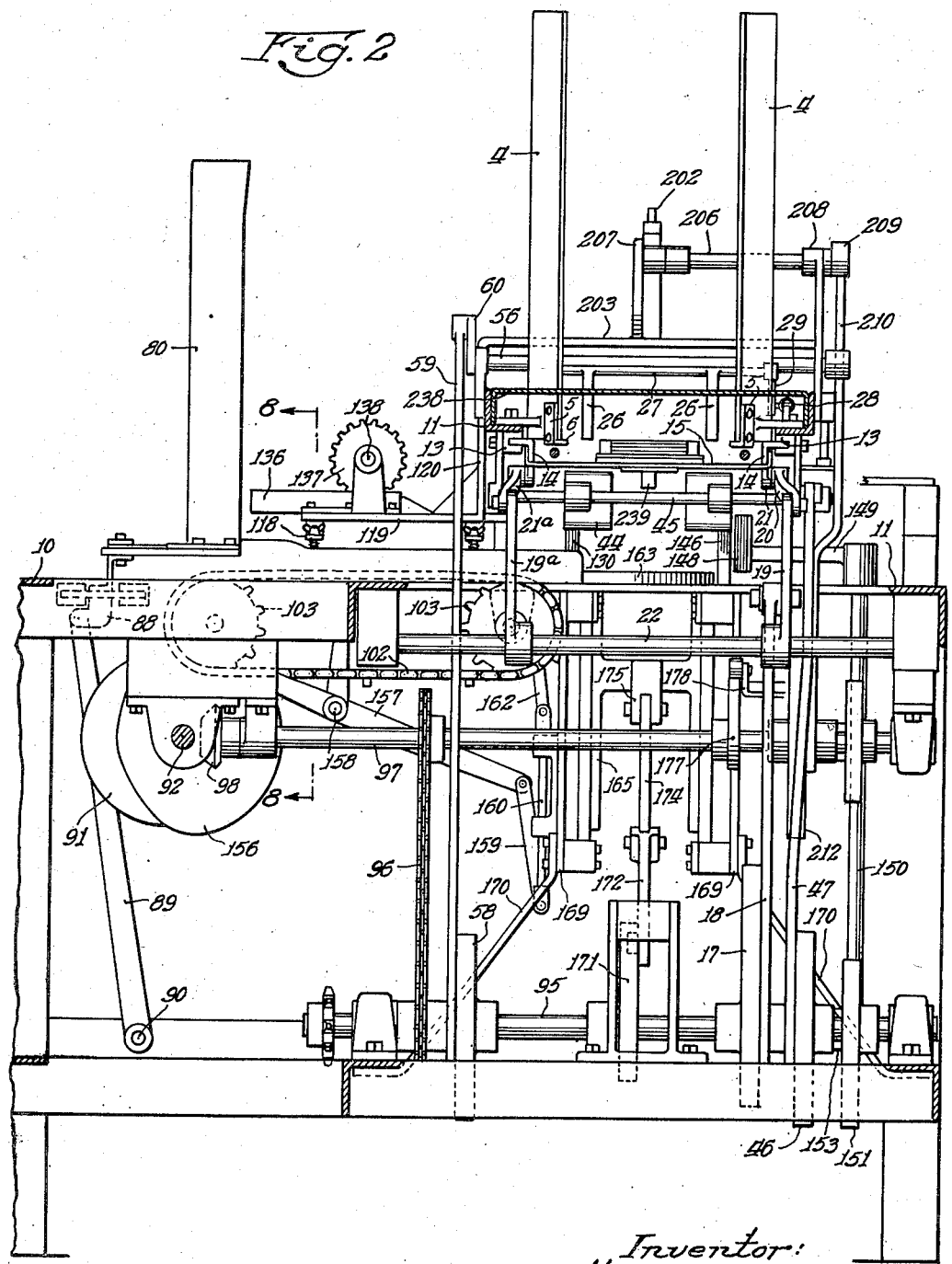

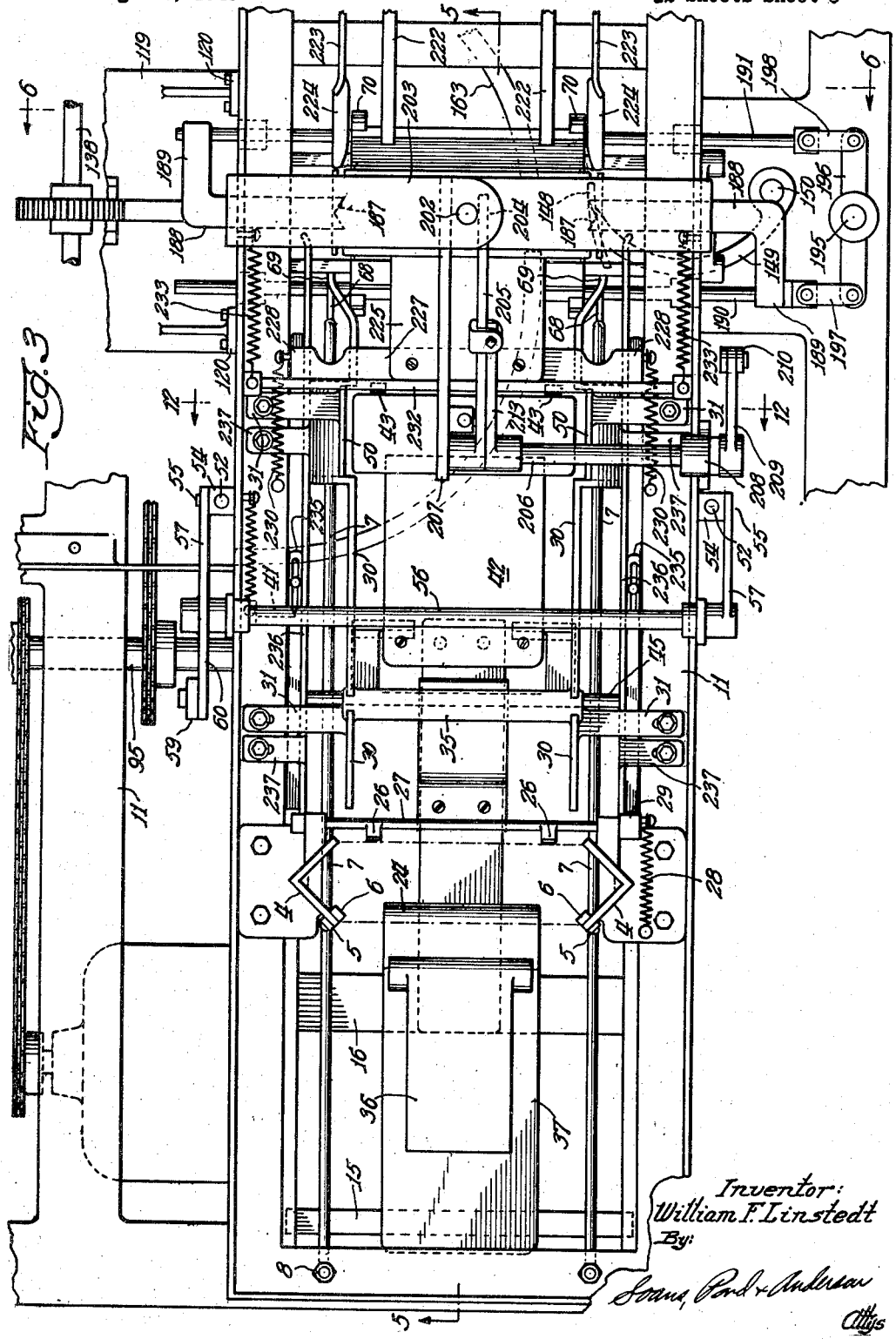

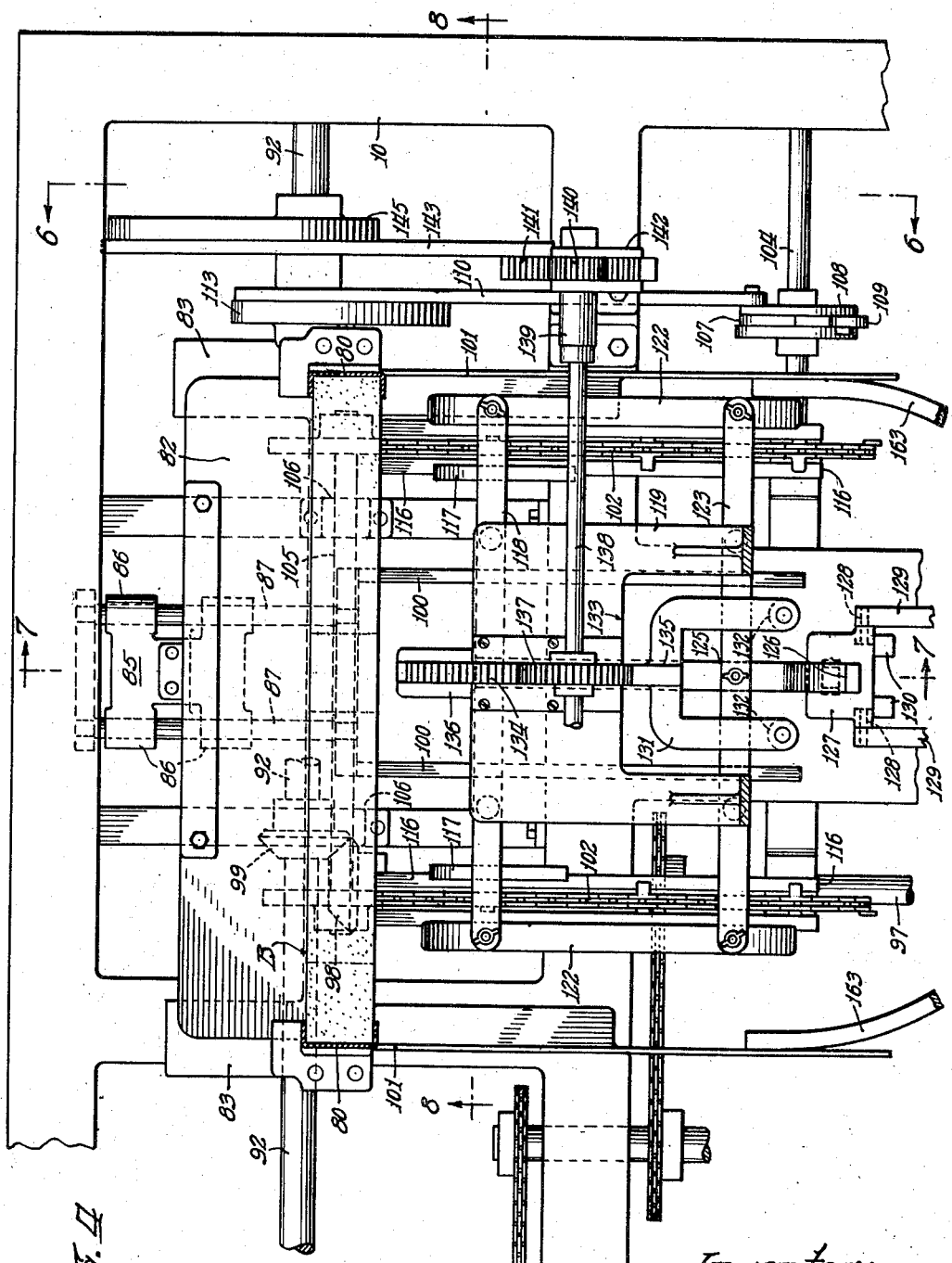

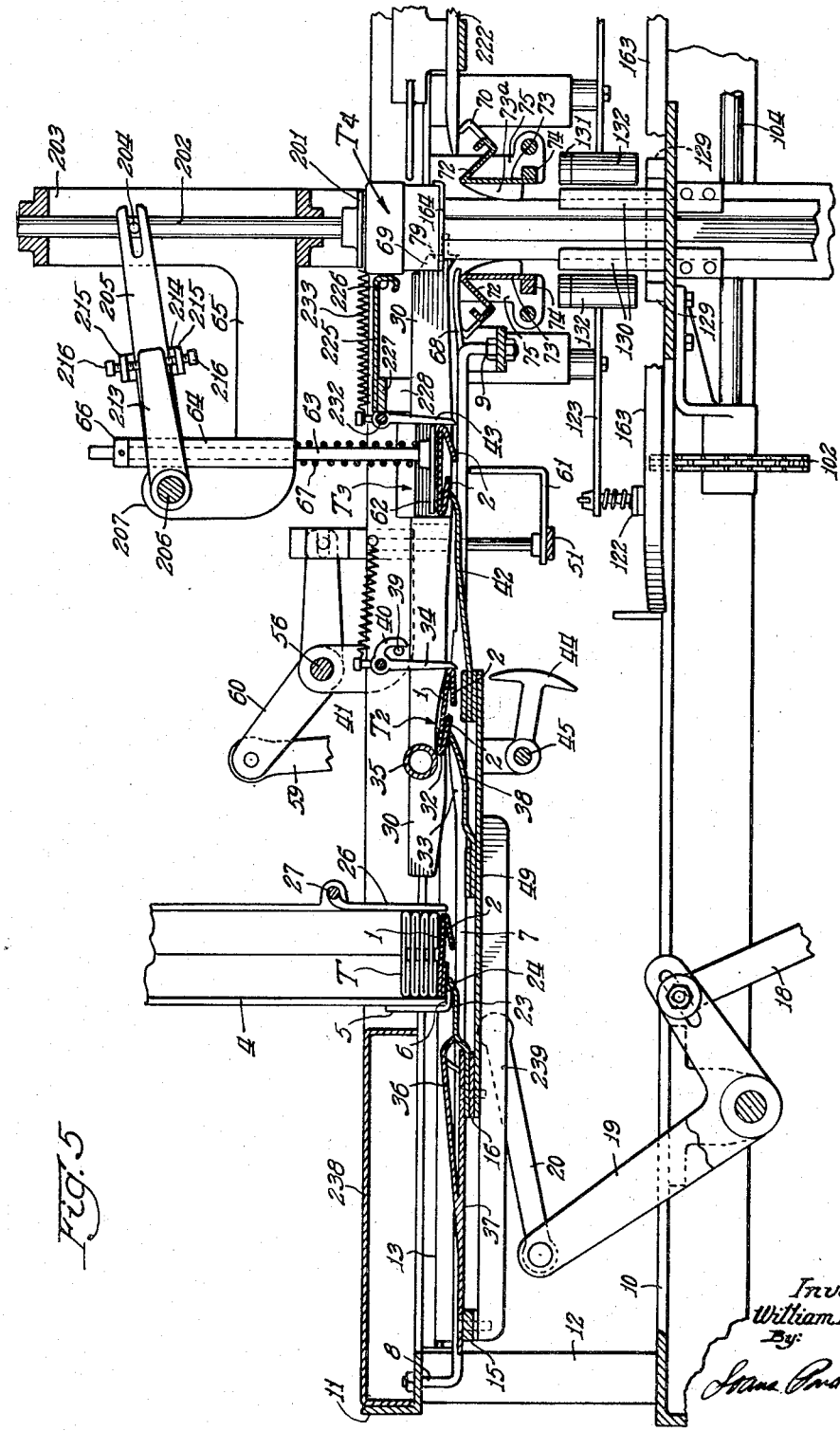

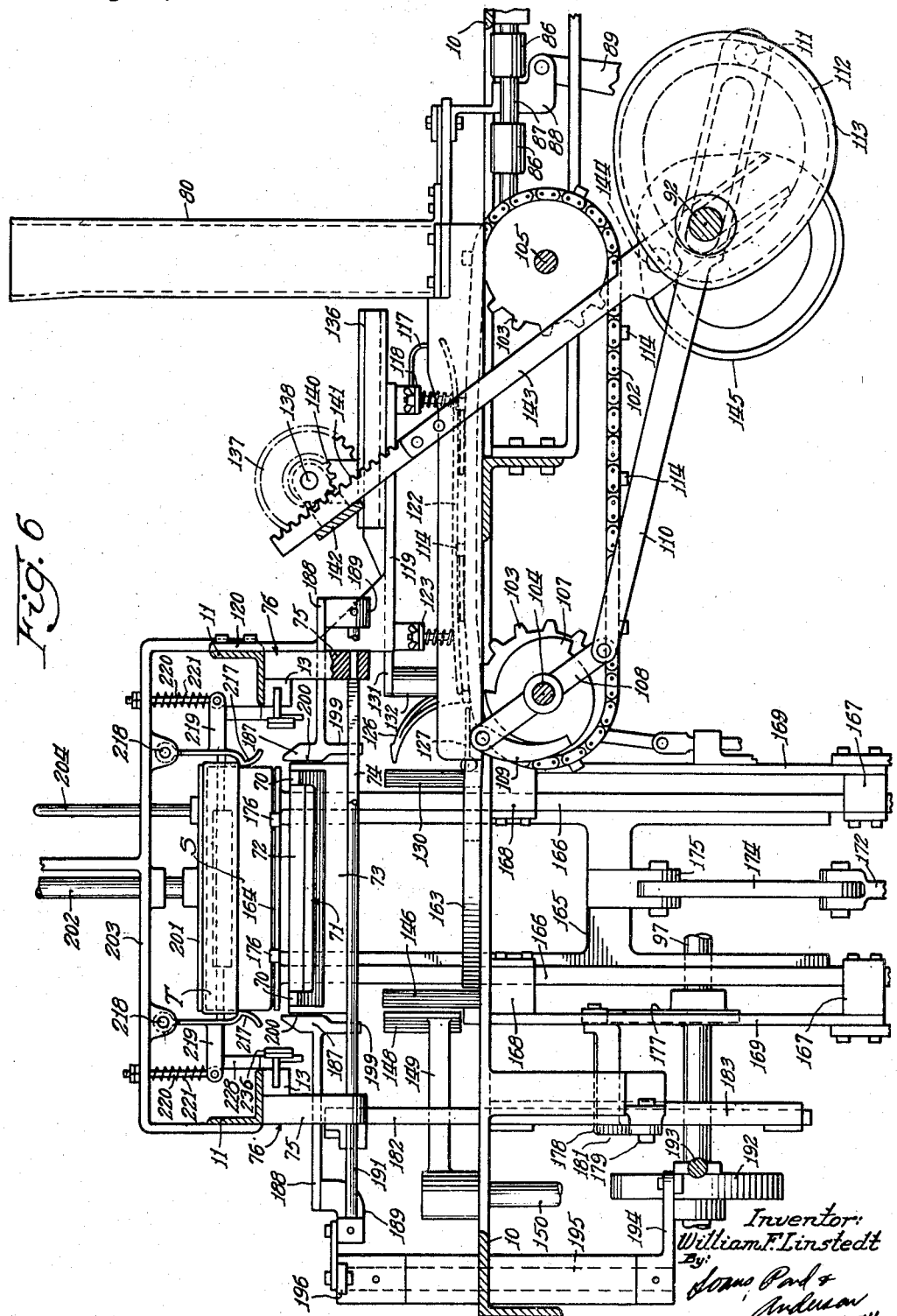

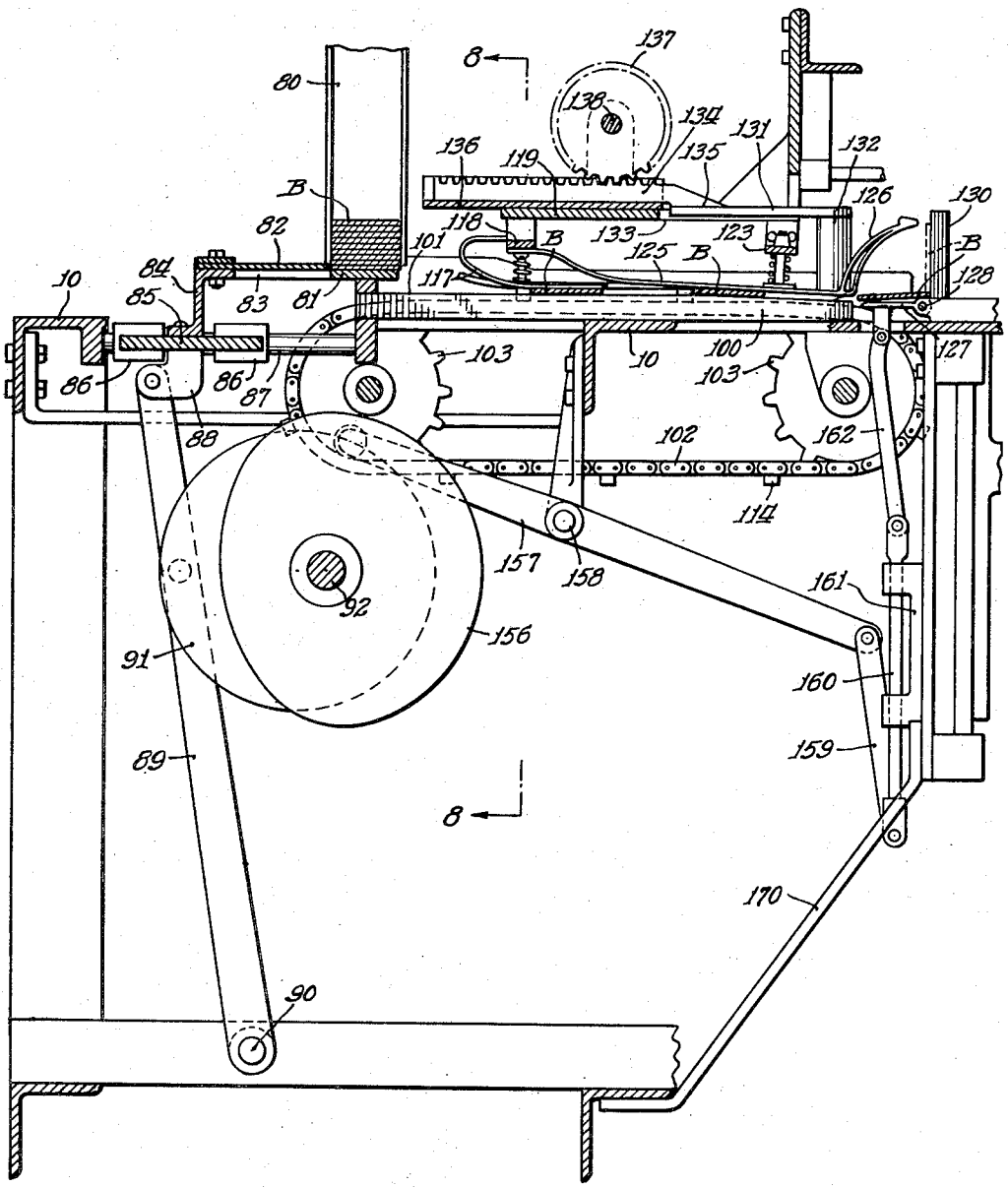

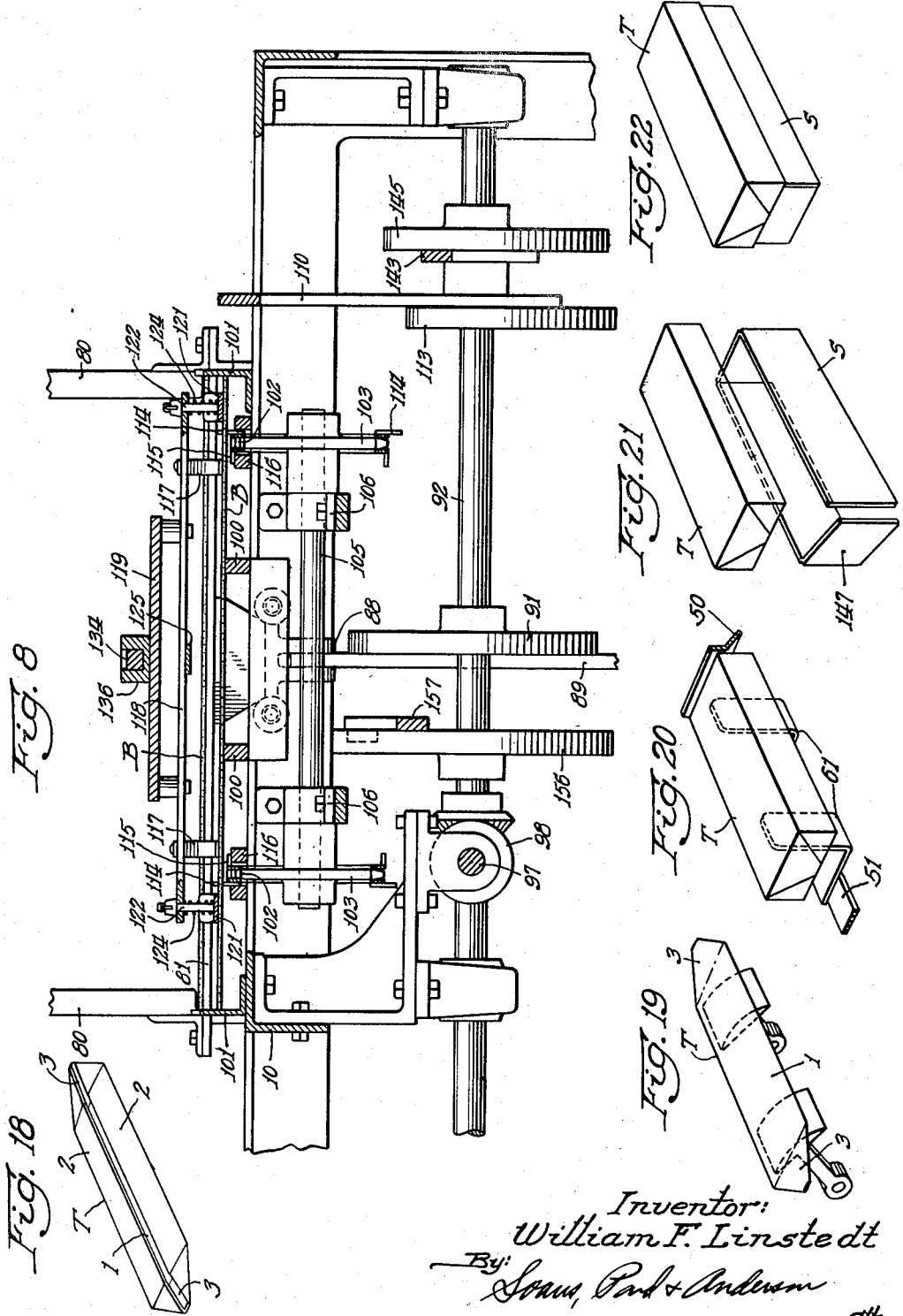

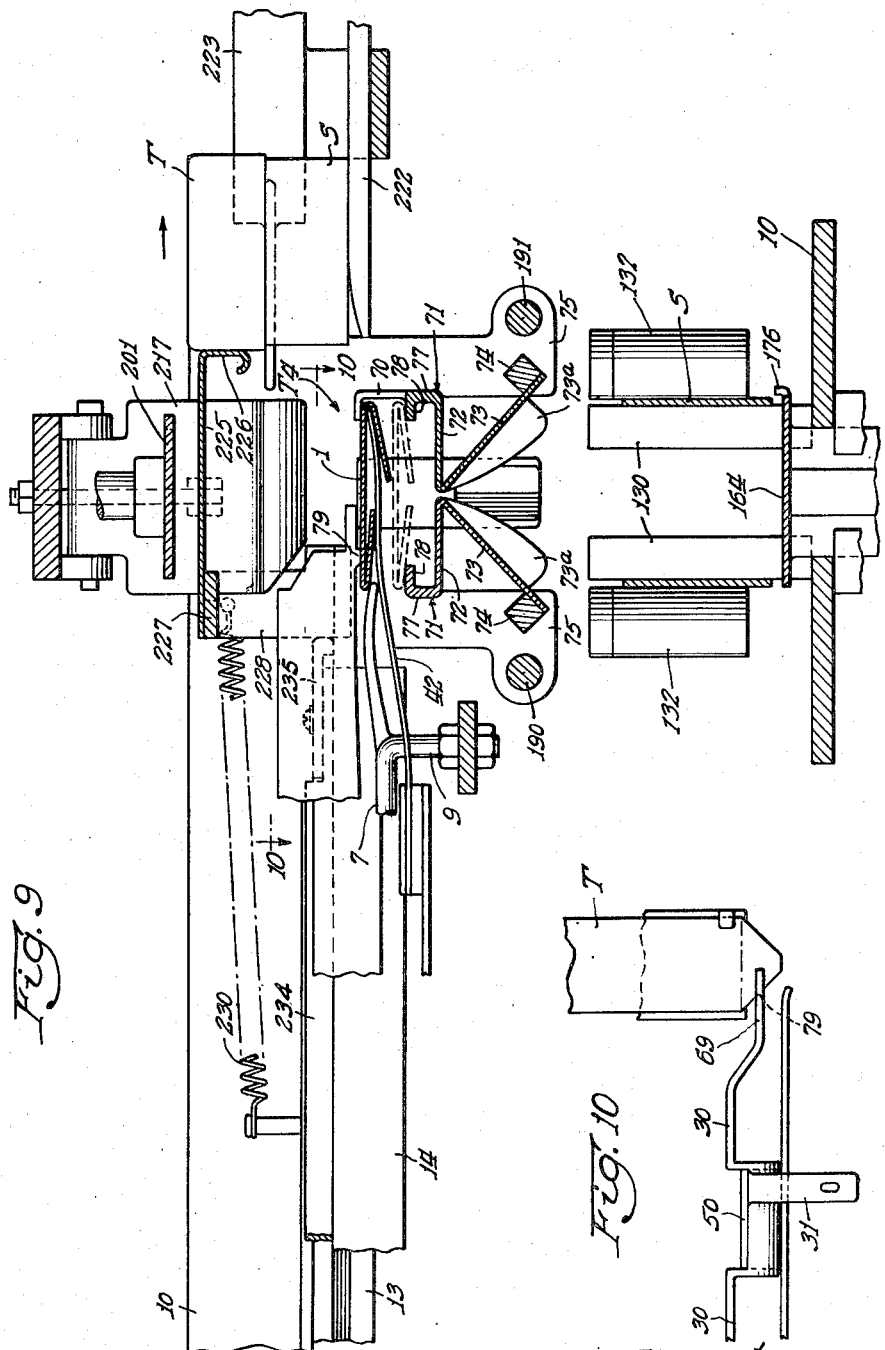

July 21, 1953     W. F. LINSTEDT     2,645,984
BOXMAKING MACHINE
Filed Aug. 22, 1946     12 Sheets-Sheet 11

Inventor:
William F. Linstedt
By: Soans, Pond & Anderson
Attys.

July 21, 1953     W. F. LINSTEDT     2,645,984
BOXMAKING MACHINE
Filed Aug. 22, 1946     12 Sheets-Sheet 12
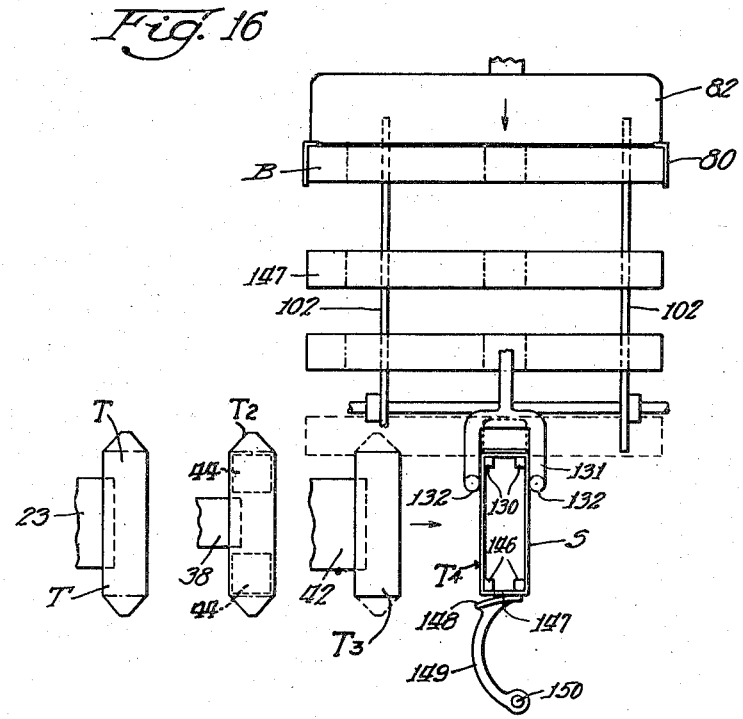
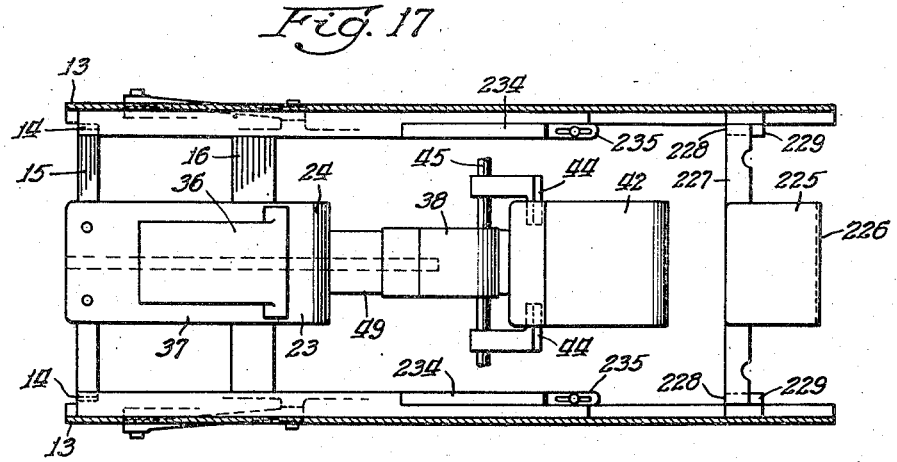
Inventor:
William F. Linstedt

Patented July 21, 1953

2,645,984

UNITED STATES PATENT OFFICE 2,645,984

BOXMAKING MACHINE

William F. Linstedt, Plymouth, Wis., assignor to Kraft Foods Company, Chicago, Ill., a corporation of Delaware Application August 22, 1946, Serial No. 692,271

7 Claims. (Cl. 93—39)

This application relates to an improvement on the apparatus shown in my pending applications Ser. No. 511,811 now Patent Number 2,581,491, granted January 8, 1952 and Ser. No. 511,812 now Patent Number 2,433,701, granted December 30, 1947, both filed November, 26, 1943 and is, in part, a continuation thereof.

This invention relates to an improvement in box making machines, and it is particularly concerned with mechanism for assembling a box structure embodying an initially collapsed, prefabricated side wall structure. The tray comprises a bottom (or top) wall, opposite side and opposite end walls, the side walls being folded inwardly over the bottom wall and the end walls being folded outwardly and refolded upon themselves as an incident to the inward folding of the side walls. The prefabricated side wall member consists of an elongated paper board strip provided with suitable fold lines to facilitate its being folded into tubular box wall forming condition. The side wall element is preferably of much heavier paper board than the tray.

The apparatus herein shown receives stacks of the collapsed trays and stacks of the side wall forming units, opens the trays and forms the side wall units into tubular wall structures and inserts the latter into the opened trays.

The main objects of the invention are to provide an efficient mechanism for opening such trays, forming the side wall units into tubular structures, and for inserting the tubular wall structures into the opened trays, wherein such mechanism will operate automatically, and can be relied upon to continue its automatic operation without the constant attention of an operator. In short, it is the main object of this invention to provide a more efficient machine of the character indicated than has heretofore been available.

Other objects and advantages of the invention will be understood by reference to the following specification and accompanying drawings wherein there is illustrated a machine embodying a selected form of the invention.

In the drawings,

Fig. 1 is a side elevation;

Fig. 2 is a vertical section on the line 2—2 of Fig. 1;

Fig. 3 is a plan of a portion of the apparatus;

Fig. 4 is a plan of another portion of the apparatus;

Fig. 5 is a vertical section on the line 5—5 of Fig. 3;

Figure 15:
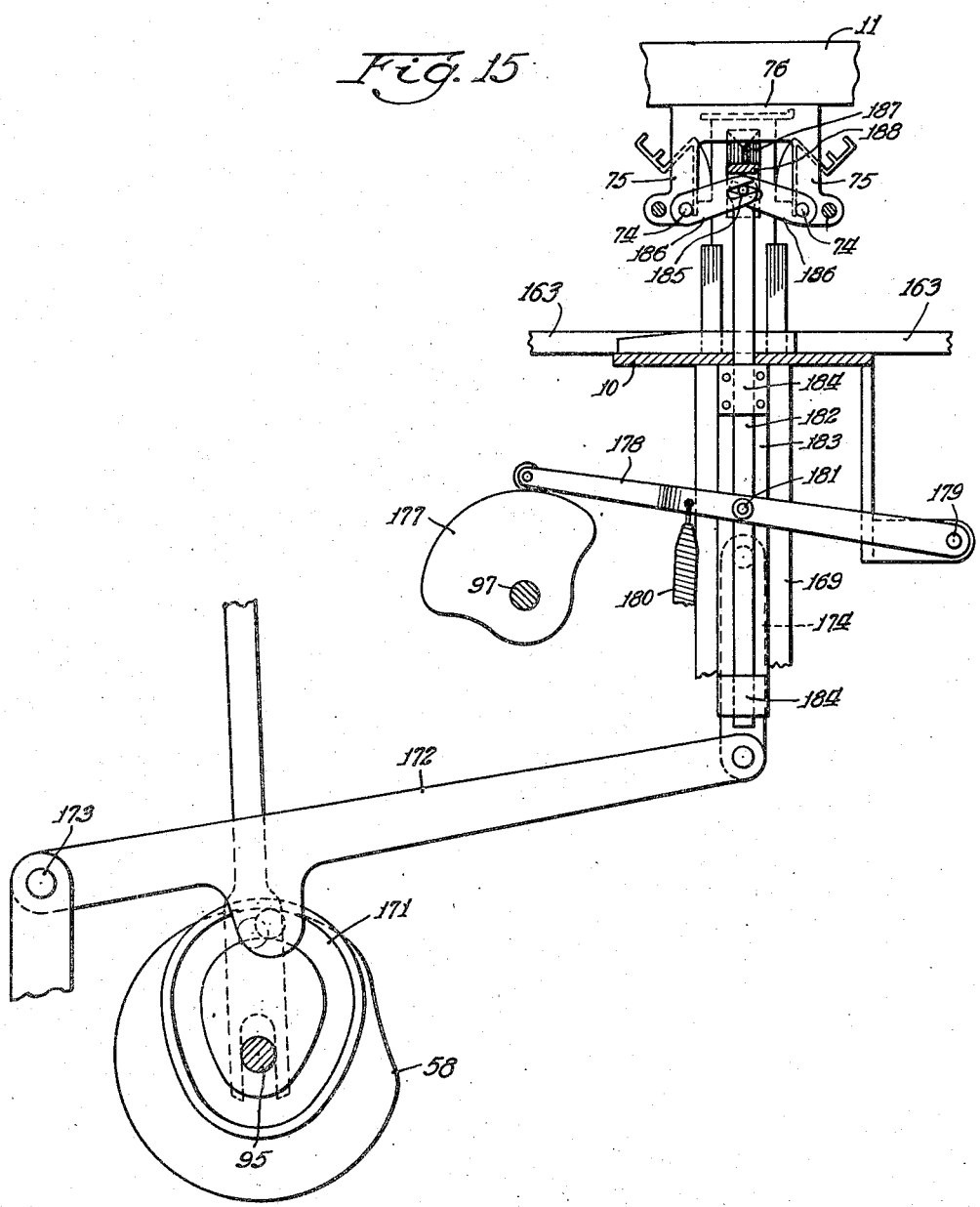

Fig. 6 is a section on the line 6—6 of Fig. 1, the location of this section being also represented by the line 6—6 on Figs. 3 and 4;

Fig. 7 is a section on the line 7—7 of Fig. 4;

Fig. 8 is a section on the lines 8—8 of Figs. 2, 4 and 7;

Fig. 9 is a section corresponding to a portion of Fig. 5, but on an enlarged scale and showing a changed position of the parts;

Fig. 10 is a plan section on the line 10—10 of Fig. 9;

Fig. 11 is a section corresponding to a portion of Fig. 5 but showing a changed position of certain of the parts;

Fig. 12 is a section on the line 12—12 of Fig. 3;

Fig. 13 is a section corresponding to Fig. 12 but showing the parts in a changed position in which they also appear in Fig. 11;

Fig. 14 is a section on the line 14—14 of Fig. 11;

Fig. 15 is a sectional view illustrating certain parts of the mechanism shown in Fig. 1 but on a larger scale, some of these parts being also shown in Fig. 6;

Fig. 16 is a diagrammatic illustration;

Fig. 17 is a section on the line 17—17 of Fig. 1;

Fig. 18 is a perspective illustrating a typical collapsed tray which is opened or distended and into which the side wall structure is inserted; and, Figs. 19 to 22, inclusive, are perspective illustrations of successive steps of operation on the tray and side wall structures as affected by the machine.

The apparatus receives collapsed paper board trays of the character shown in Fig. 18, such trays embodying a bottom (or top) wall 1 of generally rectangular form, side walls 2—2 folded inwardly over the bottom wall, and end walls 3—3 which are folded outwardly from the ends of the bottom wall 1. Said end walls 3—3 are also folded upon themselves on diagonal lines as illustrated, such folding being incident to the inward folding of the side walls 2—2 and provide a fixed, hinged connection between the side and end walls.

Trays such as shown in Fig. 18 and designated T in their entireties, are delivered in inverted position as represented in Fig. 19 to a magazine forming part of the apparatus. By successive operating elements of the mechanism, the trays while in inverted position are unfolded to the opened or distended condition illustrated in Fig. 20.

Side wall forming units which are initially in the form of elongated paper board strips are automatically fed one by one from a magazine and folded to form the tubular side wall structure represented at S in Fig. 21, such side wall structure being next inserted into the unfolded tray to form the box structure represented in Fig. 22. The blanks B are suitably scored or weakened transversely along the lines on which they are to be folded into said tubular form.

As shown in Fig. 16, the trays are advanced step by step in a sidewise direction and the side wall forming blanks B are advanced step by step in a transverse direction to a mechanism which folds the blanks into the tubular side wall structure S which is then inserted into an opened tray positioned above the side wall structure.

The collapsed trays are deposited in a magazine which comprises upstanding angle members 4—4 which are adapted to embrace the opposite pointed ends of the trays (Figs. 2, 3 and 5). The rear wall portion of each of the receptacle forming members 4 is provided at its lower end with an L-shaped member 5 which has a lower horizontal leg extending inwardly under the lower end of such rear wall so as to form supporting ledges 6—6 for the collapsed trays. The front portions of the collapsed trays in the magazine are supported by horizontal rods 7—7 which extend lengthwise of the machine under the end portions of the collapsed trays, such rods being suitably anchored as indicated at 8 and 9 (Fig. 5) to stationary frame portions of the machine.

By inspection of Fig. 1, it will be seen that the framework of the machine comprises a main or base frame 10 which may be formed of one or more castings, and a supplementary or upper frame 11 suitably supported from the base frame by posts such as indicated at 12. The upper frame 11 is here shown as being formed of angle iron.

Channel shaped guides 13 are mounted on the opposite sides of the top frame 11 (see Fig. 2), and slides 14—14 of angle form each have one leg slidably disposed in the guideways provided by the respective guides 13—13. The slides 14—14 are interconnected by a plurality of transverse members so that they are movable as a unit, such transverse connecting members being shown at 15 and 16 in Figs. 2, 3, 5 and 17. This slide structure is reciprocated according to a predetermined timing by means of a cam 17 which acts through a pitman 18, a bell crank 19 and a link 20 (see Fig. 1). Said bell crank 19 is connected by the link 20 to one side of the slide structure which is provided with a depending attaching lug 21 for that purpose. To insure smooth operation, both sides of the slide are simultaneously driven, a link 21a and rock arm 19a being provided for driving the other side. The rock arm 19a is rigidly connected to the bell crank 19 by being mounted on a shaft 22 which carries said bell crank. The shaft 22 is, of course, suitably journalled in the main frame structure.

As represented in Fig. 5, the forward side wall portion 2 of the lowermost tray in the magazine will normally spring downwardly from the bottom wall 1 of said tray to the extent permitted by the guide rods 7. Such partial opening of the side wall occurs as an incident to the inherent resiliency of the paper board of which the tray is made, such resiliency having a normal tendency to cause the tray to unfold itself.

The lowermost tray in the magazine is fed sidewise out of the magazine by means of a feed plate 23 which is fixedly secured to the transverse member 16 of the reciprocating slide. Said feed plate 23 has an upwardly inclined end portion 24 to insure entrance thereof in the space between the partially unfolded side wall 2 and the bottom wall 1 of the lowermost tray when the feeding slide is advanced. The front wall of each of the receptacle forming members 4 is upwardly recessed as indicated at 25 (see Fig. 11) to permit said lowermost tray to move forwardly under said recessed wall. A pair of fingers 26 carried by a rod 27 which is suitably journalled on the tray receptacle serves to yieldably resist such feeding of the tray, said rod and fingers being appropriately biased by spring means represented at 28 stretched between a pin extending from a fixed part of the machine and an arm 29 which depends from one end of the rod 27.

When the reciprocating feed structure is advanced from its retracted position as shown in Figs. 1, 3, 5 and 17 to its fully advanced position, the end portion 24 of the feed plate 23 will enter between the side wall portion 2 and bottom wall 1 of the lowermost tray in the magazine and will thereby be effective to feed such tray sidewise out of the magazine. Such feeding of the tray is continued until it reaches the position indicated at T-2 in Fig. 5, the tray being supported near its ends by the guide rods 7 and prevented from rising therefrom by means of overlying guide plates 30—30 which extend lengthwise over the path of travel of the trays. Said guide plates 30—30 are mounted in normally fixed position by means of ears or lugs 31 (Fig. 3) which extend outwardly from the guide plates into overlying relation to a portion of the upper frame member 11 to which said ears are suitably secured as by means of bolts. The bolts may pass through slots provided in the ears 31 so as to permit a desirable amount of transverse adjustment of the guide plates.

At the receiving station T-2, the guide plates 30 are provided with recesses in their lower edges so disposed as to form forwardly facing shoulders 32 which are adapted to engage the rear edge of the tray to prevent the same from following the feeder plate rearwardly when the same is returned to its starting position. The guide rods 7 are also provided with upwardly projected enlargements or cam portions 33 which act on the trays to force them into the said shoulder forming recess. Spring biased pivoted fingers 34 are provided for yieldingly holding the trays against said shoulders 32 so as to definitely position the trays for a purpose which will presently appear. The guide plates 30 may also be connected to each other and held in the desired spaced relation by tubular transverse member 35 which has its end slotted to embrace the respective guide plates as best shown in Fig. 3. The said tubular spacer or strut may be welded to the guide plates if desired.

When the feeding plate 23 advances to feed the lowermost tray to the position T-2, the trays in the magazine are supported by means of a supporting plate 36 which has its leading end portion raised so that it will just fit under the rear edge portions of the lowermost tray remaining in the magazine when the tray engaged by the feeder 23 is about to leave the magazine. To insure entrance of said supporting member 36 under the trays in the magazine, its front end is, of course, rounded as illustrated in Fig. 5 so that if necessary the trays can be cammed upwardly to permit the supporting plate to enter under the stack of trays. Said supporting plate 36 is inclined downwardly and rearwardly to a junction with a plate 37 which overlies and connects the transverse members 15 and 16 of the feeding structure as best shown in Figs. 5 and 17, said plate 37 is, of course, rigidly secured to said transverse members 15 and 16.

In the normal operation of the machine, when the feeding structure advances, a feeding plate 38 of vertically yieldable construction and having an upwardly inclined front end portion enters between the bottom wall 1 and the side wall 2 of the tray in the T-2 position to advance said tray to a third position indicated at T-3 (Fig. 5). The pivoted fingers 34 are, of course, readily displaced under the feeding force of the member 38 and said fingers will be returned by a suitable spring arrangement such as illustrated, to their normal positions determined by a stop pin 39 which engages a finger 40 projecting from the finger supporting rod 41.

Also, during the normal operation of the machine, a tray which has previously been advanced and positioned in the station T-3 will be fed forwardly to a fourth station designated T-4 by a vertically yieldable feeding plate 42 which has an upwardly inclined front end portion adapted to enter between the bottom wall 1 and front wall 2 of the tray to engage and advance the same. Spring biased fingers such as indicated at 43 are provided for normally holding trays in the position T-3, such fingers being readily displaced by the advancing tray and being automatically returned to their operative positions when the tray has passed the fingers so as to release them. Feeding finger 42 is represented in its most advanced position in Fig. 9.

When the feeding plate structure is in its most advanced position, the tray located in the position T-2 is subjected to an operation for breaking any glue joints which may possibly exist between the rear side wall 2 of the tray and the top wall 1. In the fabrication of the trays glue is employed for uniting end wall tabs to the side walls and it is found that it often happens that a small amount of the adhesive will be squeezed from between united parts and will cause a light bond to be formed directly between the respective side walls and the bottom wall of the tray. Such glue bonds between the forward side wall and the bottom wall are readily broken by the entrance of the feeding plate 23 into the tray as already explained. For similarly breaking any such glue bonds between the rear side wall 2 and the bottom wall of the tray there are provided a pair of bond breakers 44—44 which are carried by a shaft 45 suitably journalled in supporting brackets which depend from the upper frame 11 of the machine as best illustrated in Fig. 1. Said shaft 45 is rocked by means of a cam 46 acting through a rod 47 which is pivoted at its upper end to an arm 48 which extends from said shaft 45. While the feeding structure is in its most advanced position, bond breakers 44—44 are rocked upwardly to the position illustrated in Fig. 11 to cause its rearwardly projecting portion to enter between the bottom wall 1 and the rear side wall portion 2 to break any glue bonds which may exist. By reference to Fig. 17, it will be seen that said bond breakers 44 may rock upwardly past the feeder plate 38 and a bottom extension plate 49. The bond breakers 44 are returned almost immediately, and in any event before the wider feeder plate 42 is retracted to such a point that it would interfere with the return movement of said bond breakers. The cam 46 which guides the bond breakers is, of course, suitably formed to operate the bond breakers in the required timed relationship to the reciprocating movement of the tray feeding mechanism.

Each box is subjected to a preliminary opening operation when it is in the station designated T-3. Such preliminary opening operation is effected by moving the tray upwardly between a pair of cam-like surfaces which press the outwardly folded end walls downwardly towards normal end wall forming position, such folding of the end walls serving to automatically effect at least partial opening of the side walls to thereby more or less soften the hinge connections between the walls and bottoms of the trays to facilitate their complete opening in the station represented at T-4.

For effecting the preliminary opening operation, the side guides 30 are provided with inclined cam portions 50 formed integrally with or rigidly connected to the guides, said cam portions being recessed outwardly somewhat from the general plane of said guides as best shown in Figs. 3 and 10. The initial position of a tray in the station T-3 with reference to said cam element 50 is shown in Fig. 12 from which it can be seen that the end portions of the tray are located under said cam portions 50 and over the said guide rods 7.

For moving the tray upwardly in the position T-3 there is provided a transverse lifter bar 51 which is secured to the lower ends of a pair of vertically disposed posts 52—52 which are vertically slidably mounted in suitable bearings 53—53 secured to the sides of the upper frame structure 11. The posts 52 project upwardly beyond said bearings 53 and have secured thereto blocks 54 from which pins extend laterally outwardly as indicated at 55. A transverse shaft 56 (Figs. 1 and 3) is journalled at its end in suitable bearing brackets extending upwardly from the sides of the upper frame 11 and at its ends said shaft is equipped with arms or levers 57 which rock with the shaft and are provided with slotted free ends embracing said pins 55 so that upon rocking of the shaft 56 and arm 57 said posts 52 and the lifter bar 51 will be elevated. Rocking motion is imparted to the shaft 56 by means of a cam 58 which acts through a link or rod 59 and an arm 60 which is secured at one end to said shaft 56.

The lifter bar 51 has secured to it suitable angle plates 61—61, end portions of which project upwardly centrally of the tray in the position T-3. The upper ends of said upwardly projecting end portions are operative to enter between the adjacent edges of the side walls 2—2 and to engage the inside of the bottom wall 1. Said lifter angles 61 initially raise the tray into engagement with a presser plate 62 which is carried by the lower end of a rod 63 vertically slidably mounted in a suitable bearing block 64 which is carried by a frame supported bracket 65. The rod 63 extends upwardly beyond said bearing block 64 and has a collar 66 pinned to its upper end to limit downward movement of said rod and presser plate. A compression spring 67 disposed about said rod 63 and between the lower end of said bearing block 64 and a portion of the presser plate serves to yieldably hold the presser plate in its lowermost position as determined by the said collar 66. When the lifter members 61 are moved upwardly, said presser plate 62 is also moved upwardly and the spring 64 compressed, hence, when the lifter structure 61 is lowered or permitted to move downwardly by the formation of its actuating cam, the spring 67 will move the presser plate 62 and the underlying tray downwardly to initial position. The tray will, of course, be again folded to its collapsed condition as an incident to the engagement of the free edges of its side walls 2—2 with the underlying guide bars 7 or feed plate 42. Thus, the tray is given a preliminary working or flexing operation which softens its fold lines thereby facilitating the next operation in which the side and end walls are fully opened and a side wall structure inserted.

From the station T-3 the collapsed tray is advanced by the said feeder plate 42 over the guide rods 7 and over extension fingers 68—68 which are welded or otherwise rigidly secured to adjacent end portions of said guide rods. During such movement of the trays; they are held down on the guide rods by means of the overlying portions of the guide plates 30, free end portions 69 of which are offset outwardly as best shown in Fig. 10 to overlie only the foldable end wall portions of the collapsed trays instead of the main bottom portions thereof. Forward movement of the trays from the position T-3 to the position T-4 is limited by engagement of the leading edges of the trays with hook-like elements 70—70 (Figs. 3, 6 and 9) which are carried by the outermost of a pair of tray receiving and opening devices 71—71.

The tray receiving and opening devices 71 comprise angularly related top and funnel plate portions 72 and 73, respectively, and said devices are pivotally mounted at the lower edges of their funnel plate portions 73 by being attached to a square rod 74 which has its opposite ends suitably journalled in depending legs 75—75 of brackets 76 which depend from the upper frame structure 11.

The opening devices 71 are of a length just slightly less than the interior length of the tray to be opened thereby so that the parts 72 and 73 may enter the tray in the process of opening the same (see Fig. 6). For initially receiving the tray, the plate portions 72 are provided with upstanding edge flanges 77 and inturned flanges 78 which form ledges to receive marginal side portions of the folded blank as illustrated in dotted lines in Fig. 9. The blank illustrated in dotted lines rests on the ledges 78—78 and is dropped to that position by gravity from the position illustrated in full lines in Fig. 9 to which it is initially delivered by the feeding plate 42. When the feeding plate 42 retracts, the tray is held against return movement by means of depending lugs or ears 79 formed on the outwardly offset extremities 69 of the guide plates 30 (see Figs. 5, 9 and 10). Said lugs 79 are so located that they will engage the rearward edges of the refolded end wall portions of the tray. As soon as the feeding plate 42 is sufficiently withdrawn or retracted, the tray will drop down to the dotted line position illustrated in Fig. 9.

Opening of the tray to receive the side wall structure S is effected as part of the operation of inserting the said side wall structure. Before explaining the insertion of the side wall structure into the opened tray, the mechanism for delivering the side wall forming blanks and forming them into tubular structures will be explained.

The mechanism for delivering and forming the side wall structures is shown mainly in Figs. 4, 6, 7 and 8 of the drawings.

Side wall blanks B are initially stacked in a magazine comprising a pair of upstanding channel-shaped members 80—80 suitably supported through the agency of brackets mounted on a part of the main frame structure 10. The lowermost blank rests on a normally stationary bottom plate 81 which is suitably supported from said frame structure 10 and the front and rear flange portions of said channels 80—80 terminate short of the top surface of said bottom plate 81, a distance just slightly more than the thickness of the blanks B (see Fig. 7).

The blanks B are ejected one by one from the bottom of the magazine by means of reciprocating ejector plate 82 which is slidably supported at its ends on rearward extensions 83 of said bottom plate 81, and said ejector plate is attached to a bracket 84 which is carried by a horizontally slidably mounted plate 85.

The plate 85 is provided with pairs of bearing bosses 86 on each side which are slidably mounted on normally stationary horizontally disposed shafts or rods 87—87. The rods 87 are supported at their ends in suitably rigid frame parts as best shown in Fig. 7.

The plate 85 is provided with a depending ear or lug 88 to which a lever 89 has its upper end pivoted; the lower end of the lever being pivotally mounted as shown at 90 on a stationary frame part provided for that purpose. The lever 89 is rocked by means of a cam 91 which is suitably connected to said lever, the cam being fixed to a cam shaft 92 which is suitably journalled in bearings carried by the frame structure as illustrated in Fig. 8. The cam shaft 92 is suitably driven, in this instance by means of a connection to a main driving electric motor 93 which actuates the machine.

The motor 93 is operative through a chain drive 94 to drive a cam shaft 95 (Fig. 1) which carries the cams 17, 46 and 58, previously referred to. Said cam shaft 95 is provided with a sprocket for cooperating with a chain 96 which acts on another sprocket mounted on another cam shaft 97 (see Figs. 1 and 2) which is suitably journalled in bearings supported from the main frame structure 10. Said cam shaft 97 is provided with a bevel gear 98 at one end which meshes with a bevel gear 99 carried by said cam shaft 92 (see Fig. 4).

The cam 91 acting on the lever 89 will effect reciprocation of the side wall blank ejecting plate 82 so that upon each forward reciprocation of the said plate, the lowermost blank in the magazine 80 will be ejected from said magazine. The blank ejected will be deposited flatwise on normally stationary guide or supporting rails 100 and between upstanding side guides 101—101 (Figs. 4 and 8). The blanks are then propelled step by step by means of a pair of intermittently actuated conveyor chains 102—102 which are supported for such movement by means of sprockets 103 mounted on front and rear shaft 104 and 105. The shaft 105 may be journalled in suitable bearing brackets 106 carried by the main frame structure, and the shaft 104 may be similarly mounted for rotation but it is extended endwise as is shown in Fig. 4 for receiving driving ratchet mechanism best shown in Figs. 4 and 6.

The said ratchet mechanism comprised a ratchet wheel 107 mounted securely on the shaft 104, a cross arm 108 rockably mounted on said shaft 104 along side said ratchet 107, a pawl 109 pivoted on one end of said arm 108 for engaging the teeth of said ratchet, and a cam actuated pitman rod 110 which is pivoted to the other end of said ratchet arm 108. The pitman 110 has its cam actuated end slotted as best shown in Fig. 6 to slidably fit on the shaft 92 and it is provided with a roller 111 which engages in a cam slot 112 of a cam disc 113 carried by said driven shaft 92. The cam 113 is operative to reciprocate the pitman 110 and to thereby rock the lever arm 108 and said pawl 109 which successively engages the teeth of the ratchet 107 so as to rotate the same step by step in a counterclockwise direction as viewed in Fig. 6. The weight of the pawl 109 may be relied upon to cause it to successively engage the ratchet teeth or if desired suitable spring means may be provided for urging the pawl into driving engagement with said ratchet.

The chains 102 each carry suitably spaced flights or abutments 114 which engage the rear edges of the blanks B deposited on said guide bars 101 so as to advance the said blanks step by step in conformity with the drive of said chains. The upper reaches of the chains 102 are partially supported by means of ears 115 (Fig. 8) which project laterally from the chains and ride on the top surfaces of the inner chain guide bars 116—116. Said chain guide bars 116 are preferably formed with more or less upwardly arched upper surfaces so as to elevate the central portions of the upper reaches of the chains slightly above the normal plane of the reaches which would be determined by the upper edge portions of the supporting sprockets. By thus causing the upper chain reaches to travel through an upwardly convexed path, more effective driving engagement is maintained between the abutments 114 and the blanks propelled thereby.

During the travel of the blanks B as effected by the chains 102, the blanks are held down first by a pair of spring arms 117 which are carried by a transverse bar 118 fixedly mounted on the under side of a stationary frame or table plate 119. Said table plate 119 is a part of a bracket-like element having legs 120 which extend upwardly and are secured to the upper frame structure 11 as best shown in Fig. 2. Said spring members 117 are relatively short as best shown in Fig. 7 and act on the blank only during the initial portion of its movement by the conveyor chains. Outwardly of said spring devices 117, the blanks are held down by means of elongated shoes 121 (Fig. 8) which are suspended on posts 122 from end portions of the aforesaid cross member 118 and a similar cross member 123 which is also suspended from said table plate 119. Light coil springs 124 coiled about said posts 122 serve to yieldably hold the shoes 121 down to the extent permitted by the nuts applied to the upper ends of said posts for engaging the end portions of the supporting cross members.

As best shown in Fig. 4, the holding devices 117 and 122 are disposed on opposite sides of the respective conveyor chains 102 so as to hold the blanks down relative to said chains on both sides thereof. The central portions of the blanks are subjected to the hold down effect of an elongated centrally disposed spring blade 125 which is secured at its rear or outer end to the transverse member 118 as best shown in Fig. 7. At its front or inner end, the said spring blade 125 is formed with an upwardly and forwardly curved hornlike element 126 for a purpose which will presently appear.

The blank is delivered from the ends of the supporting bars 100 into overlying relation to a plate 127 which is pivoted as indicated at 128 between the ends of a pair of stationary frame supported bars 129—129.

The pivoted plate 127 is rocked so as to turn the blank B about its forward or leading edge, from its horizontal position as illustrated in full lines in Fig. 7 to a vertical position as illustrated in dotted lines in said figure, the blank being then disposed against a pair of upright posts 130 (see Figs. 4, 6, 7 and 16).

The plate 127 is rocked in properly timed relation to the movements of other parts of the mechanism by means of a cam 156 carried by the cam shaft 92. Said cam 92 acts against a roller carried by one end of an arm 157 which is pivoted intermediate its ends as indicated at 158 on a bracket carried by the main frame structure. The other end of said arm 157 is connected by means of a link 159 to the lower end of a rod 160 which is vertically slidably mounted in a normally stationary bracket 161. The upper end of said rod 160 is connected by means of a link 162 to said pivoted plate 127 so that rocking movement of the arm 157 will be translated into rocking movement of the pivoted plate 127.

The posts 130 are spaced from each other so that the distance across their opposite outer surfaces is equal to the inside width of the side wall structure S, and the blanks are folded into U-shape form around said posts.

For effecting folding of the blanks B around the posts 130 there is provided a folder fork 131 which is provided at the free ends of its forked arms with a pair of depending rolls 132—132. Said rolls 132 are spaced from each other a distance which exceeds the spacing of the opposite outer sides of the posts 130 by about twice the thickness of the said wall forming blank B so that when said forked folder with its rolls 132 is moved endwise across the posts 130, said rolls 132 will be operative to fold the blank B around said posts (see Fig. 16).

The folder fork 131, in its retracted position, is located in a recess 133 provided in the plate part 119 (Figs. 4 and 7) and it has secured to it a rack bar 134, the latter having an end portion welded or otherwise united to said fork 131 as indicated at 135. The rack bar 134 is slidably mounted in a suitable guide channel 136 which is fixedly secured to said plate member 119. The said rack bar and the folding structure are reciprocated by means of a gear 137 which meshes with the teeth of the rack bar 134 and is suitably oscillated to effect the desired reciprocation of said folder.

The gear 137 is secured to a shaft 138 which is suitably journalled in bearings such as represented at 139 mounted on the main frame 10. One end of said shaft 138 is provided with a small gear 140 which meshes with a rack bar 141 held in cooperative relation to said gear by means of a guiding shoe 142 which is pivotally supported on said shaft 138. The rack bar 141 is carried by a bar 143 which has its lower end forked and straddling the cam shaft 92 (see Fig. 6). Said bar 143 is provided with a roller 144 which engages the groove of a rotating cam 145 which is formed to effect the desired reciprocation of the bar 143 and its rack 141.

In addition to the posts 130 there is provided a second pair of posts 146—146 (see Figs. 2, 6 and 16) which, together with the posts 130, define the inside corners of the side wall tube or sleeve S. After the blank B is folded around the posts 130, an end portion 147 of the blank is folded around the adjacent post 146 so as to extend across to the other post 146 and to meet the other end of the blank as will be readily apparent from an inspection of Fig. 16. Such folding of the blank end portion 146 is effected by an oscillating folder 148 carried by the free end of an arm 149 which is secured to a vertically disposed rock shaft 150.

The rock shaft 150 is suitably journalled in bearings provided in the main frame 10 (see Fig. 1) and it is rocked by means of a cam 151 which acts on a roller 152 carried by a bar 153. The bar 153 has one end forked to straddle the cam shaft 95 and its other end slidably mounted in a suitable bearing bracket carried by the main frame 10 so that the bar may reciprocate under the action of its cam 151. The bar 153 is connected by means of a link 154 to the free end of an arm 155 which is secured to said shaft 150 so that reciprocation of said bar 153 will be translated into rocking motion of the shaft 150 and said end folder 148.

During the folding of the blank B about the posts 130, it is centrally supported by resting on the end portions of said frame bars 129 and near its ends by means of inwardly arched side bars 163—163 which terminate short of the corner posts 146 (see Figs. 1, 2, 4 and 6).

After the blank B has been folded into the tubular side wall structure S, it is moved upwardly along the corner posts 130 and 146 and between the tray opening devices 71—71 and into the overlying tray T which will be opened as an incident to the operation. The tubular side wall structure is moved upwardly by means of an elevator or lifter plate 164 which is secured to the upper end of a vertically slidable H-shaped frame 165 (see Figs. 2 and 6). Said frame 165 has side bars 166—166 which are vertically slidably mounted in suitable vertically spaced guides 167 and 168 which are carried by stationary bars 169—169 suitably secured at their upper ends to the main frame structure 10 and rigidly supported at their lower ends by means of brace bars 170—170 which rigidly connect said bars 169 with lower portions of the main frame structure. To insure rigidity of the supporting bars 169, the brace members 170 are preferably of the inverted V-shape illustrated in Fig. 1.

The vertically slidable frame 165 with its lifter plate 164 is reciprocated by means of a cam 171 which acts on a roll carried by an arm 172 pivotally mounted on one end as indicated at 173 (Fig. 1). The other end of said lever 172 is connected by means of a link 174 to a depending forked ear portion 175 which is formed integrally with or otherwise rigidly secured to a portion of said frame 165.

The lifter plate 164 is normally disposed below the level of the blank supporting arms 163 and it may advantageously be provided with upwardly extending ears 176 where needed to prevent lateral displacement of the side wall tube from said lifter plate after the tube is freed from the posts 130 and 146.

By reference to Fig. 9, it will be seen that when the side wall tube S is elevated, its upper end will come into engagement with the walls 73 of the tray opening devices 71. Said walls 73 are rocked outwardly in properly timed relation to the upward movement of the body tube S so as to permit free movement of the body tube while at the same time guiding the same into the overlying tray T.

The required opening movement of the guiding or funnel forming plates 73 is effected by properly timed cam mechanism shown in Fig. 15. Said cam mechanism comprises a suitable box cam 177 carried by the cam shaft 97, said cam acting on a roller carried by one end of a lever 178 which is pivoted at its other end as indicated at 179 on a bracket carried by the main frame of the apparatus. A spring 180 stretched between a portion of the arm 178, and a portion of the frame bracket 170 serve to urge the lever to rock in one direction so as to maintain its cam engaging roller in engagement with the cam 177.

The arm 178 is suitably connected by means of a transverse pin indicated at 181 to a bar 182 which is vertically slidably mounted in a suitable guide 183 which depends from and is rigidly secured to a portion of the main frame 10. The guide 182 may be of channel-shape form and the bar 182 may be retained therein by means of cover plates such as indicated at 184—184 which are suitably secured to the side portions of the guide member. The upper end of the vertically slidably mounted rod 182 is provided with a transverse pin 185 which extends laterally from the rod and into the forked ends of a pair of arms 186—186 which are secured to end extensions of the pivoted rods 74 of the said tray opening devices 71—71.

Downward vertical movement of the rod 182 (Fig. 15) will operate through its cross pin 185 and the arms 186—186 to rock the shafts or pivot rods 74—74 in opposite directions so as to close said tray opening devices 71—71 from the position illustrated in Fig. 15 to the position illustrated in Fig. 9. Such movement is effected by the action of the spring 180 and reverse movement, i. e. opening of the tray opening devices 71—71 is effected by the action of the cam 177.

The opening movement of the tray opening devices 71—71 is effected in predetermined timed relation to the upward movement imparted to the tubular side wall structure so that as the latter moves upwardly between the guide plate portions 73—73, said plates will open up or spread apart at their upper edges to permit the tubular wall structure to move between them. In the course of such opening movement, the upper edge portions of said funnel forming guide plates 73—73, and the adjacent or inner edge portions of the plates 72—72 enter between the opposite side wall portions of the tray and unfold the same from the collapsed condition illustrated in Fig. 9 to a fully opened position in which the tubular side wall structure may enter the tray.

Such opening of the tray is further assisted if not mainly effected by means which press the opposite end portions of the collapsed tray inwardly toward each other at about the same time that the tray opening devices 71—71 are being opened. The end wall pressing means is best shown in Figs. 3 and 6 and it comprises oppositely disposed presser elements 187—187 having shank portions 188 extending horizontally outwardly therefrom and outer mounting portions 189—189 which extend both downwardly and laterally from said shanks to facilitate mounting of the presser members respectively on horizontally spaced rods 190 and 191. The rods 190 and 191 are slidably mounted in suitable bearings formed in the aforesaid bracket legs 75—75, and means are provided for reciprocating said rods or shafts simultaneously in opposite directions.

The means for reciprocating the shafts 190 and 191 in opposite directions comprises a cam 192 mounted on said cam shaft 97 which cam acts against a roller carried by a longitudinally slidably mounted rod 193. As best shown in Fig. 1, said rod 193 is slidably mounted as aforesaid by having one end thereof forked and straddling said cam shaft 97 and its other end slidably mounted in a suitable bearing carried by the main frame structure. The cam 192 may be a box cam so as to positively effect movement of the rod 193 in both directions. The rod 193 is connected by means of an arm 194 to the lower end of a shaft 195 which is rotatably mounted in a suitable bearing structure carried by the main frame 10, and at its upper end said shaft has mounted on it a cross arm 196. The opposite ends of said cross arm 196 are connected by links 197 and 198 to the adjacent ends of the transverse shafts 190 and 191. It will be seen that incident to the cam effected reciprocation of the rod 193, the shaft 195 will be rocked and the transverse shafts 190 and 191 reciprocated simultaneously in opposite directions by the described linkage. Accordingly, the presser member 187 carried by the shaft 190 will be moved inwardly at the same time that the other presser member 187 carried by the shaft 191 is moved inwardly.

Lower portions 199 of the said presser members 187 initially engage the end points of the folded tray to apply the desired unfolding pressure thereto and said lower portions 197 are preferably of V-shaped transverse cross section so as to fit the pointed ends of the collapsed tray and to hold the same in proper position. The arrangement is such that the bottom wall 1 of the tray is moved upwardly as an incident to the opening of the tray, this following from the fact that the tray is supported against downward movement by the side wall opening members 71—71. As the bottom wall of the tray moves upwardly, its end walls gradually approach the normal opened flattened condition. To properly act against the flattened end wall portions, the said pressure members 187—187 have their upper portions flattened as represented at 200.

The tubular side wall body S is moved upwardly between the plates 73—73 of the tray opening devices 71—71 in such relation to the opening movement of the latter that the upper portion of the side wall tube will enter the opened tray just before the sides are permitted to move upwardly out of the control of the tray opening devices. To this end, there is provided an upper holding or control plate 201.

The holding plate 201 is carried by a vertically slidably mounted shaft 202, the latter being slidably mounted in a suitable bracket structure 203 which is supported from the upper frame 11 (see Figs. 5 and 6). The holding plate 201 is held against rotation by means of an upwardly extending pin 204 which is slidable through said frame bracket 203. The plate 201 is moved downwardly to engage the bottom panel 1 of the collapsed tray almost immediately after the tray reaches the dotted line position thereof shown in Fig. 9 so that the succeeding upward movement of the tray bottom panel is under the control of said holding plate 201.

Upward movement of the latter is controlled and actuated in proper synchronism with the upward movement of the side wall tube structure S by cam means shown in Figs. 1, 2, 3 and 5. As there shown, said shaft 202 is provided with a cross pin which enters a slot provided in the free end of an arm 205 which is journalled at its other end on a shaft 206 so as to be rockable thereon. Said shaft 206 is suitably journalled in bearings represented at 207 and 208 which are carried by stationary frame or bracket members. The shaft 206 also has secured to it an arm 209 which is pivotally connected at its free end to the upper end of a pitman rod 210, the lower end of which is forked and straddles the cam shaft 97 so as to be guided thereby. Said pitman rod 210 is provided with a cam following roller 211 which cooperates with a suitable box cam 212 carried by the cam shaft 97 and appropriately formed to rock the shaft 206 in the desired timed relationship to the other operating parts.

Rocking motion is transmitted from the shaft 206 to the arm 205 by means of a short arm 213 which is rigidly secured to the shaft 206 so as to rock therewith, and means carried by the arm 205 which embraces the free end of said arm 213. The means shown in the drawings consists of a U-shaped bracket 214 which is rigidly secured to the arm 205 in such a manner that its legs 215—215 embrace the arm 213. Screws 216—216 are threaded through the arms 215 of the bracket so as to engage the opposite sides of the arm 213 so that rocking movement of the latter will be transmitted directly to the arm 205 and thence to the vertically slidable shaft 202 and its holding plate 201. By adjusting the screws 216, the operating position of the holding plate 201 may be adjusted.

The holding plate 201 is so controlled that it prevents the tray from slipping off the tray opening devices 71—71 before the upper edge portion of the tubular wall structure has been entered into the tray. Once the side wall structure has been started into the tray, the side wall structure and the tray may continue their movement upwardly with little or no guidance from the tray opening devices 71—71, it being observed, however, that the side wall tube will be moved upwardly at a speed sufficiently greater than the speed of upward movement permitted the tray, to insure full insertion of the side wall tube into the tray by the time the latter reaches its uppermost position represented in the position T-4 in Fig. 5. The tray opening or side wall tube guides are provided with end flanges 73a to properly guide the ends and corners of the side wall tube into the tray.

The complete box structure represented in the position T-4 in Fig. 5 is next advanced sidewise to a receiving conveyor or chute, such movement of the completed box being effected as an incident to the movement of the collapsed tray feeding mechanism previously described. To permit the movement of the completed box structure out of the position illustrated in Fig. 4, the lifter plate 164 is lowered to free the box. To prevent the box from following the lifter plate 164 downwardly, holders 217—217 (Figs. 6 and 9) are provided, said holders being pivotally supported at their upper ends as shown at 218 from the frame supported bracket 203. Each of said holders 217 has an outwardly projecting arm 219 from the outer end of which a bolt 220 extends upwardly. The bolts 220 are a free sliding fit through openings provided in the bracket 203 and nuts provided on the upper ends of said bolts serve to limit the extent to which the said bolts may move downwardly and thereby the extent to which the box holders 217 may move inwardly to press on the ends of the box. Compression springs 221 are provided around the bolts 220 and between the ends of the arm 219 and the bracket 203 to urge the box holders 217 to their innermost position. The said innermost position may be so adjusted that the holders 217 will bear only lightly on the ends of the box. As illustrated, said holders are so formed as to engage the tubular wall structure S of the box immediately below the free edges of the side wall portions of the tray.

When the box is supported by the holders 127 it may be readily moved laterally from between them to a suitable conveyor or chute here represented by bottom bars 222 and side guides 223, the latter having receiving end portions 224 so formed as to receive and guide the boxes into the chute.

Delivery of the boxes from the station represented at T-4 to the chute is effected by an ejecting plate 225 which has a depending box engaging flange portion 226 (see Figs. 3, 5, 9 and 17). Said ejector plate 226 is carried by a cross bar 227 which has end portions turned downwardly as indicated at 228, and secured to suitable blocks 229—229 which are slidable in extensions of the channeled guideways 13—13. The coiled tension springs 230—230 stretch between end portions of the cross bar 228 and fixed points of the upper frame 11 serve to yieldingly hold the ejector plate 225 in its retracted position as illustrated in Fig. 5. The retracted position of the ejector plate is determined by engagement of a portion of the sliding structure with a normally stationary stop or other portion of the apparatus. In this instance, rearward or retracting movement of the cross bar 227 is limited by engagement with the cross shaft 232 which is suitably journalled in the upper frame structure 11 and carries the fingers 43 which have previously been referred to. Springs indicated at 233—233, stretched between stationary points of the frame structure and pins projecting from end portions of said shaft 232, normally urge said shaft to turn in one direction to impart to the fingers 43 their desired yieldingly holding effect, but said shaft is not otherwise movable. Hence, it may be relied upon for determining the retracted position of the ejector plate 225.

Ejecting movement of the plate 225 is effected by the tray feeding mechanism. For this purpose the side members 14—14 of the said tray feeding mechanism are provided with bar extension members 234—234 and with abutment members 235—235 longitudinally adjustably mounted on said extension bars 234. The free ends of said abutment members 235 are adapted to engage the slides 229 which carry the ejector structure to effect ejecting movement thereof. The ejector movement is substantially less than the step by step feed movement of the collapsed trays, and the arrangement is such that said abutments 235 have free travel during the first portion of the tray feeding movement and come into operative engagement with said ejector slides so as to effect ejecting movement thereof only for the required portion of the travel of the tray feeding mechanism. Hence, the completed boxes are moved from the station T-4 only slightly more than the transverse width thereof whereas the collapsed trays are advanced a distance which approximates three times their widths. During the travel of the trays through the machine they are held against endwise shifting by means of longitudinally extending side guides 236—236 which are laterally adjustably mounted on the upper frame structure 11 by means of outwardly extending lugs 237. As shown, the lugs 237, like the lugs 31 for the guides 30, are provided with slots through which fastening bolts pass for threaded engagement with the underlying frame element.

Because of the fairly extensive travel of the tray feeding slide structure, a cover member 238 (Fig. 5) is provided to cover a portion of the slide structure. Said cover may be of sheet metal construction and may rest on the horizontal flange portions of the elevated frame 11 as shown, and it may be detachably secured in place in any convenient manner.

For reinforcing the feeding slide structure, a longitudinally extending reinforcing bar 239 (Figs. 2, 5 and 14) is secured to the under side thereof in the relationship illustrated. Said bar 239 imparts the desired rigidity to the structure which might otherwise tend to flex excessively because of its light weight sheet metal construction.

In the apparatus described, the collapsed trays may be stacked in the magazine 4 in the condition in which they come from the maker and without any preliminary softening or other treatment. The feeding mechanism described is quite positive in its operation and serves to effectively break any glue bonding which may inadvertently be produced between one of the side walls of the tray and its bottom wall. Any such glue bonding which may exist between the other side wall and the bottom panel is, of course, effectively broken by the bond breakers 44 which have a very positive action against the tray since the latter is securely held against rearward movement in the guide recess 32. The provision of the spring held fingers 26, 34 and 43 serves, of course, to insure full entrance of the feeding slide fingers into the tray before the tray begins to move out of its starting position. Hence, the feeding mechanism is made operative to accurately feed each tray a predetermined distance so as to properly position the trays in the successive stations as described.

The provision of means for working the tray, that is to preliminarily open the tray and then reclose it for feeding to the final opening and side wall inserting station is an especially advantageous part of the described mechanism in that it greatly facilitates the functioning of the final tray opening devices 71—71 and the insertion of the tubular side wall structure S into the opened tray.

The handling of the side wall forming blanks and accurate feeding thereof to the folding mechanism is also very positively effected by the described ejecting, conveying and folding mechanism. The folding mechanism although of very simple form operates very efficiently and requires a minimum amount of travel of the folding mechanism whereby the attainment of simplicity is facilitated.

The mechanism described is operative at a very high rate of speed and with a minimum amount of supervision or attention. Various changes in the details described may be made while retaining the principles of the invention.

I claim:

1. In box making apparatus of the class described, the combination of means for supporting a supply of collapsed trays in inverted position, reciprocable means embodying a plurality of tray engaging elements adapted to successively engage the trays to advance them step by step along a predetermined path of travel, one of said tray engaging elements being adapted to enter between relatively folded portions of the lowermost tray in said supply to thereby effect an initial opening of said folded parts and to feed the engaged tray edgewise for a predetermined distance, means for preventing retraction of the tray advanced by said first-mentioned element upon retraction of the latter, means for engaging and effecting initial opening of another folded portion of the tray advanced by said first-mentioned element while such advanced tray is held against retraction, means for acting on the tray in a direction transversely of the direction of action of said feeding and opening elements for effecting a preliminary opening of said tray, a second of said feeding elements being operative to feed the tray from its first advanced position to said preliminary opening means, and means for effecting final and complete opening of said tray preparatory to the insertion of other material thereinto, a third of said feeding elements being operative to engage and advance the tray from said preliminary opening means to said final opening means.

2. Apparatus of the class described for distending a collapsed tray which comprises a main wall panel, side wall panels folded inwardly from opposite edges of said main panel, and end panels folded outwardly from opposite edges of said main panel and refolded upon themselves as an incident to connections between said end panels and side panels, the apparatus comprising means for delivering such a collapsed tray from a supply thereof to a predetermined position, means for acting on the outwardly folded end panels of said tray in said predetermined position to preliminarily fold the same towards a side wall forming angularly related position to said main panel, thereby to also incidentally effect preliminary unfolding of said inwardly folded wall panels, the fold line connections between the side and end wall panels and said main wall panel being thereby flexed so as to reduce the initial stiffness thereof, means for feeding the preliminarily opened tray from said predetermined position to another position, and means acting on said tray in said other position to effect final opening of the tray preparatory to the insertion of material thereinto.

3. Apparatus of the class described for distending a collapsed tray which comprises a main wall panel, side wall panels folded inwardly from opposite edges of said main panel, and end wall panels folded outwardly from opposite side edges of said main panel refolded upon themselves as an incident to connections between said end panels and side panels, the appartus comprising means for delivering such a collapsed tray from a supply thereof to a predetermined position, means for acting on said tray in said predetermined position to effect preliminary opening thereof, said preliminary unfolding means comprising normally stationary cam members respectively associated with the opposite ends of the collapsed tray, means for moving the collapsed tray relative to said cam members so as to cause said outwardly extending end portions of the tray to be folded inwardly of the main panel thereof toward an end wall forming position and whereby said inwardly folded wall panels are also, incidentally, at least partially unfolded and whereby the fold line connections between said side and end wall panels and said main panel are flexed so as to reduce the initial stiffness thereof, means for feeding the preliminarily opened tray from said predetermined position to another position, and means for acting on said tray in said other position to effect final opening of the tray preparatory to the insertion of material thereinto.

4. A box making apparatus of the class described, comprising means for delivering a collapsed paper board tray from a supply thereof to a predetermined position, said tray comprising a main wall panel, side wall panels folded inwardly from opposite edges of said main panel, and end panels folded outwardly from opposite edges of said main panel and refolded upon themselves as an incident to connections between said end panels and side panels, a pair of normally stationary cam members associated with the opposite ends of the tray in said predetermined position, said cam members extending upwardly and inwardly relative to the tray ends, means for engaging said main panel of the tray and effecting upward movement thereof to cause the said end panels to engage said cam members to be thereby folded downwardly and inwardly relative to the main panel and said side wall panels to be incidentally folded downwardly and outwardly, said main wall panel engaging means being also operative to return the main panel to its initial position whereby the inherent resilience of the tray material will effect refolding of the tray to substantially the collapsed position in which it was delivered to the said predetermined position, means for feeding the preliminarily opened and refolded tray from said predetermined position to another position, and means for acting on said tray in said other position to effect final opening of the tray preparatory to the insertion of material thereinto.

5. In box making apparatus of the class described comprising means for supporting a supply of collapsed trays, means for effecting opening of said trays one by one and insertion of material into the opened trays, means for feeding the collapsed trays step by step from said supply holding means to said tray opening and material inserting means, and means independent of said collapsed tray feeding means but actuated thereby during a terminal portion only of the feeding movement thereof for feeding the trays containing material inserted therein as aforesaid from the position in which material is inserted as aforesaid, the trays containing inserted material being thereby advanced a lesser distance than the collapsed trays.

6. In box making apparatus of the class described, the combination of means for holding a supply of collapsed trays, means for feeding said trays one by one laterally from the bottom of said supply holding means, a support underlying the path of travel of the trays for supporting the same when they are advanced by said feeding means, a guide element overlying said path of travel for holding the trays down on said underlying support, guide carried stop means for preventing reverse movement of said trays, and means acting on the trays when in engagement with said stop means for effecting initial opening of a portion of the tray.

7. In box making apparatus of the class described, the combination of means for holding a supply of collapsed trays, reciprocable means for feeding trays one by one from said supply, supporting means underlying the path of travel of the trays for supporting the same while they are being fed forwardly by said feeding means, a guide overlying the path of travel of said trays for holding the same in engagement with said supporting means, said guide having a recess therein for receiving the successive trays to prevent retraction thereof as an incident to retraction of said feeding means, and cam-like means on said supporting means for guiding said trays into said recess.

WILLIAM F. LINSTEDT.

References Cited in the file of this patent

UNITED STATES PATENTS

| Number | Name | Date |
|---|---|---|
| 365,124 | Godfrey | June 21, 1887 |
| 395,094 | Valentine | Dec. 25, 1888 |
| 1,282,102 | Milmoe et al. | Oct. 22, 1918 |
| 1,463,454 | Anderson et al. | July 31, 1923 |
| 1,893,389 | Bellmann | Jan. 3, 1933 |
| 2,241,817 | Howard | May 13, 1941 |
| 2,289,297 | Rein | July 7, 1942 |
| 2,433,701 | Lindstedt | Dec. 30, 1947 |
| 2,461,569 | Riemer | Feb. 15, 1949 |